United States Patent Office 3,284,394
Patented Nov. 8, 1966

3,284,394
AQUEOUS DISPERSION OF A COPOLYMER OF METHYLMETHACRYLATE AND BETA - HYDROXYETHYLMETHACRYLATE
Tzeng Jiueq Suen, New Canaan, and William C. Meisenhelder, Darien, Conn., assignors to American Cyanamid Company, Stamford, Conn., a corporation of Maine
No Drawing. Filed Mar. 24, 1965, Ser. No. 442,516
1 Claim. (Cl. 260—29.6)

This application is a continuation-in-part of application Serial No. 198,439, filed May 29, 1962, now abandoned.

This invention concerns certain novel aqueous dispersions useful in the preparation of translucent films. More specifically, the present invention deals with the manufacture of a novel cross-linkable copolymer containing aqueous dispersion or latice, which when coated on a substrate, dried and heat-treated is capable of providing a glossy, continuous, substantially insoluble and infusible film of excellent hardness, strength, chemical resistance and clarity.

Film-forming copolymer-containing aqueous dispersions, especially those wherein the copolymer has been prepared by emulsion copolymerization of acrylic monomers, are well known in the art and have been employed in a variety of coating applications. Normally, the monomers used in preparing such emulsion copolymers are of two distinct types—hardening monomers, i.e., those whose glass transition temperatures are about 30–35° C. and which tend to form relatively inflexible polymers; and softening monomers, i.e., those whose glass transition temperatures are below about 15–20° C. and which tend to form soft, flexible polymers. Unfortunately, experience with dispersions of emulsion copolymers containing preponderant amounts of either hardening or softening monomers have for the most part proven unsatisfactory where the manufacture of films is concerned. For example, in those instances where hardening monomers are used in major amounts, resulting polymers, unless plasticized, will not form films at room temperature or higher by simple deposition on a substrate. Moreover, the situation is not alleviated by adding a conventional non-reactive plasticizer such as dibutyl phthalate, because the volatilization of the plasticizer whether during or after the formation of the film can lead to detrimental changes in the physical properties of the film such as shrinkage, embrittlement, etc. In those cases where the plasticizers remain in the film after formation, they tend to cause various undesirable properties in the film, such as diminished solvent resistance, lack of clarity, and softening of the material. On the other hand, films formed from emulsion copolymers containing a preponderant moiety of softening monomers suffer from the deficiency of lack of hardness, durability and chemical resistance essential to most coating or laminate applications.

According to the concept of the present invention, we have now discovered that a particular class of highly alkoxymethylate melamines will not only function as a plasticizing agent in the formation of film-forming emulsion copolymers containing quantities of hardening monomers, but also serve to cross-link continuous films prepared from copolymers of this class containing comonomers having functional groups reactive with an N-hydroxymethyl or -alkoxymethyl function to form substantially insoluble and infusible films. This concept, to the best of our information and belief, has never before been appreciated; and it becomes an object of our invention to provide a novel aqueous dispersion which corresponds to the attributes of the aforesaid material.

A further object of our invention is to provide the art with a novel aqueous dispersion capable of forming continuous films and which comprises reactive aqueous emulsion copolymers containing sufficient quantities of hardening comonomers that they will not form films at ambient temperatures after simple deposition on a substrate, thus permitting the use of such copolymers in preparing continuous films. Further, our invention relates to the use with the aforesaid material of relatively large quantities of highly alkoxymethylated melamine resins as plasticizing and cross-linking agents. These and other objects of our invention will be more elaborately exemplified by recourse to the following description as well as the several specific embodiments of our invention presented.

Briefly stated, the novel aqueous dispersion of our invention comprises two essential components. The first component is a reactive water-insoluble emulsion copolymer prepared from about 50 to about 98% by weight, and preferably from about 65 to about 90% by weight, based on the total weight of monomers in the copolymer, of (A) a monoethylenically unsaturated hardening comonomer containing no functional groups capable of reaction with an N-hydroxymethyl or N-alkoxymethyl group, for example, methylmethacrylate; and from about broadly 2–20% by weight, but preferably from about 5–10% by weight of (B) a monoethylenically unsaturated comonomer containing a functional group which is reactive with an N-hydroxymethyl or N-alkoxymethyl group. An example of this comonomer would be acrylic acid or methylacrylic acid.

While as stated above the preferred comonomer (A) is methylmethacrylate, certain other alkyl methacrylates such as ethylmethacrylate, propylmethacrylate, n-butylmethacrylate, isobutylmethacrylate, and the like, as well as mixtures thereof may also be employed in addition to or instead of methylmethacrylate. Comonomer (B), on the other hand, is preferably an acrylic acid, an acrylic acid amide, or a hydroxylated alkyl ester of an acrylic acid, and is preferably itself a hardening comonomer. Included among the reactive group containing monomers are those such as ethacrylic acid, α-chloroacrylic acid, the corresponding amides, e.g., acrylamide, methacrylamide and the like, as well as the hydroxylated alkyl esters of acrylic and methacrylic acid such as β-hydroxyethyl methacrylate, β-hydroxyethyl acrylate, β-hydroxyethyl α'-chloroacrylate, γ-hydroxypropylacrylate, δ-hydroxybutyl methacrylate, and the like.

If desired, the reactive water-insoluble emulsion copolymer may also include (C) a monoethylenically unsaturated softening comonomer containing no functional groups which are reactive with an N-hydroxymethyl or -alkoxymethyl group. These softening monomers preferably comprise an alkyl acrylate wherein the alkyl group is non-tertiary, i.e., it includes no tertiary carbon atoms, and contains from 1 to about 12 carbon atoms, such as methyl acrylate, ethyl acrylate, propyl acrylate, n-butyl acrylate, 2-ethylhexyl acrylate, octyl acrylate, dodecyl acrylate, and the like, as well as mixtures thereof, and can be present in the copolymer in amounts ranging from 0% to about 45% by weight, based on the total weight of monomers in the copolymer, depending on the properties or combinations of properties, e.g., hardness coupled with flexibility, desired in the final product. Comonomer (C), if employed, will generally replace part of comonomer (A), but in any event, the total amount of hardening monomer(s) present will be such that the copolymer, if unplasticized, will be incapable of forming continuous films at ambient temperatures. This usually means that the copolymer will contain not less than about 50% by weight, based on the total weight of monomers in the copolymer, of hardening monomer(s). Furthermore, in every case the total amount of comonomers (A), (B) and (C) employed will equal 100%.

Suitable methods for the preparation of aqueous emulsion copolymers of the type employed in practicing the present invention from monomers such as those listed hereinabove are so numerous and so well known in the art that only the most cursory treatment is necessary here. In general, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodexylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as polyoxyethylene sorbitan monolaurate, monopalmitate, monostearate, and the like, anionic, e.g., sodium lauryl sulfonate, sodium isopropylnaphthalene sulfonate, diisobutyl sodium sulfosuccinate, di-2-ethylhexyl sodium sulfosuccinate, and the like, or a mixture of non-ionic and anionic emulsifying agents. Since the pH of the aqueous dispersion of the emulsion copolymer will be adjusted to at least 7, and preferably higher, prior to adding the highly alkoxymethylated melamine, cationic emulsifying agents, due to their instability under basic conditions, are not particularly preferred.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as α,α'-azobisisobutyronitrile and the like, an inorganic persulfate, such as ammonium persulfate, sodium persulfate, potassium persulfate, and the like, or a redox catalyst system, such as sodium metabisulfite-potassium persulfate and the like. The particular catalyst or catalyst system chosen can generally be used in amounts ranging from about 0.01% to about 3% by weight, based on the total weight of comonomers present. The polymerization reaction can be carried out at temperatures ranging from about 0° C. to about 100° C., preferably at from about room temperature (25° C.) to about 70° C., and the emulsion will preferably be agitated during the reaction. The resulting aqueous emulsion copolymer can have a molecular weight ranging from about 25,000 to about 1,000,000 or higher, as determined by intrinsic viscosity measurements [see Flory, "Principles of Polymer Chemistry" (Ithaca, N.Y., Cornell University Press, 1953) pages 308 to 311], and will generally be present in the dispersion in amounts ranging from about 30% to about 60% by weight, and usually from about 40% to about 50% by weight, based on the total weight of the dispersion at this point.

As previously indicated, following the copolymerization reaction the pH of the aqueous dispersion is adjusted to at least 7, e.g., to between 7 and about 10, and preferably to between about 7.5 and about 9.5. This is done in order to maintain a stable system once the highly alkoxymethlated malamine is added to the dispersion. Any basic substance, e.g., sodium hydroxide, potassium hydroxide, and the like, may be used to adjust the pH, but it is preferred that the basic substance employed by a volatile base, such as ammonia, triethylamine, and the like, which can be volatilized off to provide the acidic conditions necessary for the highly alkoxymethylated melamine to cross-link the thermosetting aqueous emulsion copolymer through its reactive functional groups.

The second essential component of our novel aqueous dispersions is a highly alkoxymethylated melamine represented by the general formula:

$$MF_xA_y$$

wherein M represents melamine, the starting material, $F_x$ represents the degree to which the melamine starting material has been methylolated, with $x$ representing a number between about 5 and 6, inclusive, and $A_y$ represents the degree to which the methylol groups of the polymethylomelamine intermediate have been alkylated with lower alkyl groups containing from 1 to 3 carbon atoms, inclusive, i.e., methyl, ethyl and propyl groups, to provide alkoxymethyl groups containing from 2 to 4 carbon atoms, inclusive, in the highly alkoxymethylated melamine final product, with $y$ representing a number between 5 and 6, inclusive. Thus, the highly alkoxymethylated melamines employed in the practice of the present invention include the hexa-alkyl ethers of hexamethylolmelamine, such as hexakis(methoxymethyl)melamine and the like, which represent the highest degree of methylolation and alkylation obtainable, the penta-alkyl ethers of hexamethylolmelamine, such as the pentamethyl ether of hexamethylolmelamine and the like, and the penta-alkyl ethers of pentamethylolmelamine and the like. Furthermore, as is evident from the general formula and the values of $x$ and $y$ given above, one can use mixtures of these highly alkoxymethylated melamines, e.g., a mixture of hexakis(methoxymethyl)melamine and the pentamethyl ether of hexamethylolmelamine, as well as mixtures containing minor amounts of alkoxymethylated melamines having a slightly lower degree of methylolation or alkylation. In such cases $x$ and $y$ represent average values for the degree of methylolation and alkylation. Hexakis(methoxymethyl)melamine or mixtures containing a major amount thereof together with minor amounts of other highly methoxymethylated melamines having slightly lower degrees of methylolation and methylation are preferred for use in practicing the present invention.

Highly alkoxymethylated melamines are prepared by methods which are so well known in the art that it is not necessary that they be set forth herein in any great detail. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolmelamines, and thereafter reacting the polymethylolmelamines, under acidic conditions, with from about 10 to about 20 mols of a lower alkanol, such as methanol, ethanol, propanol, and the like, per mol of melamine starting material. Various modifications and improvements of this basic process have been developed, such as those set forth in U.S. Patents Nos. 2,715,619 to Suen et al. and 2,918,452 to Kun et al.

The highly alkoxymethylated melamine can be added to the aqueous dispersion containing the thermosetting copolymer either as a liquid melt or as a high solids dispersion in water, e.g., a dispersion of highly alkoxymethylated melamine containing from about 30% to about 60% solids, and preferably from about 40% to about 50% solids. The plasticizing amount of highly alkoxymethylated melamine employed can range from about 10% to about 100% by weight, based on the weight of the reactive copolymer, depending on the composition of the particular reactive copolymer employed, the highly alkoxymethylated melamine or mixture of highly alkoxymethylated melamines used to plasticize the copolymer, and the temperature at which the aqueous dispersion containing these two essential ingredients is dried.

While we do not wish to be bound by any particular theory or reaction mechanism advanced to explain the operation of the invention, it is believed, as previously indicated, that the highly alkoxymethylated melamine component of our novel aqueous dispersions performs a twofold function therein. First of all, it acts to plasticize the acrylic copolymer component, which is still in the thermoplastic state, coalescing the separate reactive copolymer particles during the time at which the dispersion or latex, cast on a suitable substrate, is being dried, thereby providing a continuous film. As stated hereinabove, the temperature at which our novel aqueous dispersions can be dried ranges from a maximum of about 170° C. to a minimum of about 25° C. or, in other words, to about room temperature, and at these temperatures drying will usually take about 15 minutes or more. In addition to its plasticizing function, the highly alkoxymethylated melamine also serves to effect cross-linking between the essentially linear reactive acrylic copolymer chains by reacting with the residual functional groups, i.e., the carboxyl, amide or hydroxyl groups, contained therein. This crosslinking reaction is carried out at temperatures ranging from about 100° C. to about 200° C. for periods of time ranging from about 2 minutes to about 60 minutes. From this, it can be seen that the cross-linking reaction can take place either during the drying step, if drying is carried out at sufficiently elevated temperatures, or subsequent thereto, if drying is carried out at relatively low temperatures, e.g., at room temperature.

The unexpected and visibly apparent advantage characterized by the composition of our invention over those previously known to the art may be summarized by stating that prior to our filing it had not been possible to use polymers with high amounts of hardening monomer without the use of a volatile plasticizer or elevated temperatures for drying the emulsion and obtain a continuous film. This we have achieved by the addition of hexakis (methoxymethyl)melamine plasticizer-cross-linking agent. As can be seen, the use of our system permits the practical, everyday use of an aqueous dispersion of comonomers with the resultant disregard for molecular weight which in a one-phase system would pose immediate problems of viscosity. Thus, with our unique approach, we are not only able to have a desirable two-phase system, but we are able to do so with an added advantage to being able to transform this aqueous emulsion into a clear, homogeneous molded film. Moreover, all of this can be done without the need for massive amounts of expensive and dangerous organic solvents. This is the nub of our invention, and it is believed to be unique in this regard.

In those cases where a non-volatile base is employed to adjust the pH of the system to the basic side prior to the addition of the highly alkoxymethylate melamine or where it is desired to accelerate the cross-linking reaction, from about 0.1% to about 1% by weight, based on the combined weights of the thermosetting acrylic copolymer and the highly alkoxymethylate melamine, of a conventional acidic curing catalyst, such as paratoluenesulfonic acid, benzenesulfonic acid, hydrochloric acid or other acid salts of tertiary amines, such as triethylamine, or hydroxyalkyl amines, such as 2-methyl-2-amino-1-propanol, and the like, can be added to the aqueous dispersion prior to drying. Similarly, other conventionally employed additives, such as pigments, dyes, fillers, powdered or flaked metals, ultraviolet light absorbers, and the like, can also be added at this point.

As previously mentioned, our novel aqueous dispersions are particularly useful as coating compositions, and may be used to coat various substrates such as metals, wood, glass, asbestos cement siding, and the like to provide protective as well as decorative qualities, especially where such materials are to be used for outdoor applications, e.g., as exterior surfacing members for houses and the like.

In order that those skilled in the art may more fully understand the inventive concept presented herein, the following illustrative examples are set forth. These examples are given solely by way of illustration and should not be considered as expressing limitations unless so set forth in the appended claims. All parts and percentages are by weight, unless otherwise stated.

PREPARATION OF DISPERSION A.—70/20/10 METHYLMETHACRYLATE / ETHYLACRYLATE/METHACRYLIC ACID

A solution containing 8 parts of dioctyl sodium sulfosuccinate and 0.26 part of sodium bicarbonate dissolved in 600 parts of water was charged to a suitable reaction vessel equipped with thermometer, stirrer and inert gas inlet tube. After flushing the solution with nitrogen gas (a stream of nitrogen gas was employed to maintain an inert atmosphere throughout the reaction) and then heating it to 60° C. with stirring (stirring being continued throughout the preparation), 0.44 part of ammonium persulfate was added, followed two minutes later by 40 parts of a monomer solution consisting of 280 parts of methyl methacrylate, 80 parts of ethyl acrylate and 40 parts of methacrylic acid. The temperature of the resulting emulsion was allowed to rise to 80° C. and was then maintained at between 80° C. and 90° C. for the remainder of the reaction. The balance of the monomer solution was then added to the emulsion over a period of one hour. After the last addition of the monomer solution the emulsion was heated for an additional hour and then cooled to room temperature. Finally, the polymer dispersion, which had a solids content of 40.4%, was adjusted to a pH of 7.0 with amonium hydroxide.

PREPARATION OF DISPERSION B.—90/10 METHYLMETHACRYLATE/METHACRYLIC ACID.

A solution containing 4.5 parts of dioctyl sodium sulfosuccinate and 0.3 part of sodium bicarbonate dissolved in 537 parts of water was charged to a suitable reaction vessel equipped with thermometer, stirrer and inert gas inlet tube. After flushing the solution with nitrogen gas (a stream of nitrogen gas was employed to maintain an inert atmosphere throughout the reaction) and then heating it to 60° C. with stirring (stirring being maintained throughout the preparation), 28 parts of a solution of 0.5 part of ammonium persulfate in 35 parts of water were added, followed five minutes later by 116 parts of a monomer-emulsifier solution consisting of 405 parts of methyl methacrylate, 45 parts of methacrylic acid and 13 parts of Triton X-305 (a 70% active solution of an octylphenol-ethylene oxide condensate). The temperature of the resulting emulsion was allowed to rise to 85° C. and the remainder of the monomer-emulsifier solution was added dropwise to the emulsion over a period of one hour, during which time the temperature was maintained between 75° C. and 91° C. After the last addition of the monomer-emulsifier solution the remainder of the above-described ammonium persulfate solution was added to the emulsion and the temperature was held at 91° C. for an additional 5 minutes. The polymer dispersion was then cooled to 30° C. and adjusted to a pH of 8.2 with concentrated ammonia. It had a solids content of 45.7%.

PREPARATION OF DISPERSIONS C–O

In a manner similar to that described for the preparation of dispersions A and B, the aqueous dispersions described in Table I below in terms of their polymeric components, pH's and solids concentrations were prepared.

TABLE I

| Dispersion | Polymeric Component [1] | pH | Percent Solid Concentration |
|---|---|---|---|
| C | 60/35/5—MMA/EA/MAA | 7.1 | 41.7 |
| D | 85/15—BMA/MAA | 7.5 | 35 |
| E | 85/15—MMA/MAA | 7.5 | 35 |
| F | 60/25/15—MMA/BMA/MAA | 7.0 | 35 |
| G | 60/30/10—MMA/EA/MAA | 7.6 | 41 |
| H | 50/25/20/5—MMA/EA/AN/MAA | 7.6 | 39 |
| I | 75/15/10—MMA/EHA/MAA | 7.8 | 41 |
| J | 55/40/5—MMA/EA/MAA | 7.7 | 42 |
| K | 80/10/10—MMA/EA/MAA | 7.5 | 43 |
| L | 50/45/5—MMA/EA/MAA | 7.9 | 46 |
| M | 47/45/8—MMA/EA/MAA | 7.8 | 46.6 |
| N | 65/30/5—MMA/EA/MAA | 7.7 | 41 |
| O | 60/35/5—MMA/EA/AA | 7.1 | 42 |

[1] Monomers are expressed in parts, e.g., Dispersion C contains a copolymer of 60 parts of methylmethacrylate, 35 parts of ethyl acrylate and 5 parts of methacrylic acid.
MMA=methylmethacrylate.
BMA=butylmethacrylate.
EA=ethylacrylate.
EHA=2-ethylhexylacrylate.
AN=acrylonitrile.
S=styrene
MAA=methacrylic acid.
AA=acrylic acid.
β-HEMA=β-hydroxyethylmethacrylate.
MA=methacrylamide.

*Example 1*

One hundred parts of Dispersion A were admixed with 39 parts of a 35% aqueous dispersion of hexakis(methoxymethyl)melamine. A 12-mil (wet thickness film of this mixture was then deposited on a glass plate and air-dried at room temperature (approximately 25° C.) to give a clear, continuous film. The dried film was then baked at 165–170° C. for 30 minutes to give a hard, clear, colorless, continuous film, insoluble in acetone.

*Example 2*

The procedure of Example 1 was repeated using Disperison A without any hexakis(methoxymethyl)melamine. When air-dried at room temperature this unmodified dispersion did not give a continuous film, and even after baking for 30 minutes at 165–170° C. the film remained soluble in acetone.

*Examples 3–33*

The procedure of Example 1 was repeated in each case with the modifications noted in Table II below. The characteristics of the films obtained are also listed in Table II.

TABLE II

| Example | Dispersion | Amount [1] | Hexakis(methoxymethyl) melamine | Amount [1] | Drying Conditions | Baked Film |
|---|---|---|---|---|---|---|
| 3 | B | 100 | 35% aqueous dispersion. | 39 | Air-dried at room temperature for 30 minutes, then baked at 165–170° C. for 30 minutes. | Hard, clear, colorless, continuous. |
| 4 | B | 100 | | | ---do--- | Non-continuous. |
| 5 [2] | C | 50 | 50% aqueous dispersion. | 7.9 | ---do--- | Hard, clear, colorless, tough, continuous, good adhesion to glass. Pencil Hardness=HB-F. |
| 6 [2] | C | 50 | ---do--- | 11.9 | ---do--- | |
| 7 | C | 50 | | | ---do--- | Non-continuous. |
| 8 | D | 100 | 35% aqueous dispersion. | 39 | ---do--- | Hard, clear, colorless, continuous. |
| 9 | D | 100 | 50% aqueous dispersion. | 21 | Air-dried at room temperature for 90 minutes, then baked at 170° C. for 30 minutes. | Hard, clear, continuous, good gloss. |
| 10 | D | 100 | ---do--- | 28 | ---do--- | Do. |
| 11 | D | 100 | | | ---do--- | Non-continuous. |
| 12 | E | 100 | 35% aqueous dispersion. | 39 | Air-dried at room temperature for 30 minutes, then baked at 170° C. for 30 minutes. | Hard, clear, continuous. |
| 13 | E | 100 | 50% aqueous dispersion. | 35 | Air-dried at room temperature for 20 minutes, then baked at 170° C. for 30 minutes. | Do. |
| 14 | E | 100 | | | Air-dried at room temperature for 30 minutes, then baked at 170° C. for 30 minutes. | Non-continuous. |
| 15 | F | 100 | 50% aqueous dispersion. | 21 | Air-dried at room temperature for 15–20 minutes, then baked at 170° C. for 30 minutes. | Hard, clear, continuous. |
| 16 | F | 100 | ---do--- | 28 | ---do--- | Do. |
| 17 | F | 100 | | | ---do--- | Non-continuous. |
| 18 | G | 100 | 50% aqueous dispersion. | 23.8 | Air-dried at room temperature for 15 minutes, then baked at 160° C. for 30 minutes. | Clear, colorless, tough, continuous, excellent adhesion to glass. Pencil Hardness: 18=H–2H. 19=F–H. 20=F–H. |
| 19 | G | 100 | ---do--- | 29.8 | ---do--- | |
| 20 | G | 100 | ---do--- | 39.7 | ---do--- | |
| 21 | G | 100 | | | ---do--- | Non-continuous. |
| 22 | H | 50 | 50% aqueous dispersion. | 7.5 | Air-dried at room temperature for 25 minutes, then baked at 165–170° C. for 30 minutes. | Hard, clear, continuous, good adhesion to glass. Pencil Hardness: 22=F–H. 23=F–H. 24=HB–F. |
| 23 | H | 50 | ---do--- | 11.2 | ---do--- | |
| 24 | H | 50 | ---do--- | 15 | ---do--- | |
| 25 | H | 50 | | | ---do--- | Non-continuous. |
| 26 | J | 100 | 50% aqueous dispersion. | 14 | Air-dried at room temperature, then baked at 165–170° C. for 30 minutes. | Hard, clear, continuous. |
| 27 | J | 100 | | | ---do--- | Non-continuous. |
| 28 | K | 50 | 50% aqueous dispersion. | 30 | Air-dried at room temperature for 16 hours, then baked at 170° C. for 30 minutes. | Hard, clear, continuous. |
| 29 | K | 50 | ---do--- | 38.7 | ---do--- | Do. |
| 30 | K | 50 | ---do--- | 43 | ---do--- | Do. |
| 31 | K | 50 | ---do--- | 8.4 | Baked at 150° C. for 30 minutes. | Do. |
| 32 | K | 50 | | | Air-dried at room temperature for 16 hours. | Non-continuous. |
| 33 | K | 50 | | | Baked at 150° C. for 30 minutes. | Do. |

[1] In parts.  [2] Film thickness (wet) was 9 mils.

Example 34

A white enamel was formulated by first grinding the following components in a ball mill for 2 hours to give a pigment grind.

| Component: | Parts |
|---|---|
| Titanium dioxide [1] | 200 |
| Tamol 731 [2] | 8 |
| Triton CF–10 [3] | 4 |
| Nopco 1497–V [4] | 2 |
| Cellosize QP–4400 [5] | 25 |

[1] Pigment.
[2] Dispersing agent; a sodium salt of a polymeric carboxylic acid.
[3] Wetting agent; an alkyl aryl polyether alcohol.
[4] A lanolin-type antifoaming agent.
[5] Thickener; hydroxyethyl cellulose.

Next, 64 parts of hexakis(methoxymethyl)melamine were melted and added to 490 parts of Dispersion A, from which sufficient water had been removed to adjust the solids content to 46%. The pigment grind was then added to the plasticized dispersion and homogeneously blended therewith to give an enamel having a total solids content of 47% and a vehicle solids content of 32.5%. A 3-mil (wet thickness) film of this enamel was then cast on a 1/32-inch thick cold rolled steel panel and baked for 30 minutes at 149° C., following which the baked film was allowed to cool to room temperature and then tested for its impact strength (by the falling ball test carried out on the front, or enameled, side of the panel) and pencil hardness. The results of these tests are summarized in Table IV below.

Examples 35–42

The procedure of Example 34 was repeated in every detail but one, namely, Dispersion A was replaced with equal amounts of Dispersions C, H, I, M, N, and O respectively (in each case the solids content of the dispersion employed was adjusted to 46%). The results of the tests made on the enamel films of these examples are also given in Table IV.

TABLE IV

| Example | Dispersion | Impact Strength [1] | Pencil Hardness |
|---|---|---|---|
| 34 | A | 20 | 3H–4H |
| 35 | C | 30 | H–2H |
| 36 | H | 26–36 | H–2H |
| 37 | I | 16–18 | 3H–4H |
| 38 | M | 70 | H–2H |
| 39 | N | 36 | 2H–3H |
| 40 | O | 36 | 2H–3H |

[1] In inch-pounds.

In general, these enamel films also had excellent water resistance and good xylene resistance, and all of the coated panels passed the Conical Mandrel Test.

The following examples illustrate the inoperativeness of aminotriazine derivatives similar to those employed in practicing the present invention but having a lower degree of methylolation and alkylation.

Example 43

Hexakis(methoxymethyl)melamine and tetrakis(methoxymethyl)benzoguanamine were admixed with separate samples of Dispersion M in amounts sufficient to give 33% plasticizer, based on the weight of the copolymer in the dispersion (23% plasticizer when based on total solids, i.e., plasticizer and copolymer), in each sample. A 3-mil (wet thickness) film was then deposited from each plasticized sample onto a glass plate and allowed to air-dry at room temperature. The dried film plasticized with hexakis(methoxymethyl)melamine was continuous, whereas the film plasticized with tetrakis(methoxymethyl) benzoguanamine was non-continuous.

Example 44

Hexakis(methoxymethyl)melamine and dimethoxymethylmonomethylolmelamine were admixed with separate samples of Dispersion A in amounts sufficient to give 30% plasticizer, based on the weight of the copolymer in the dispersion, in each sample. A 3-mil (wet thickness) film was then cast from each plasticized sample onto a glass plate and allowed to air-dry for 20 minutes at room temperature. The dried film plasticized with hexakis(methoxymethyl)melamine was clear and continuous, whereas the film plasticized with dimethoxymethylmonomethylolmelamine was non-continuous.

Each film was then baked for 35 minutes at 165° C. The hexakis(methoxymethyl)melamine-plasticized film was hard, clear and continuous after this heat-treatment. The dimethoxymethylmonomethylolmelamine-plasticized film, although continuous in the center, showed many fine cracks throughout the rest of the film. In addition, its outer edge was powdery.

It will be obvious to those skilled in the art that other changes and variations may be made in carrying out the present invention without departing from the spirit and scope thereof as defined in the appended claim.

We claim:

A composition comprising an aqueous dispersion capable of forming substantially insoluble and infusible continuous films comprising:
(1) a reactive water-insoluble emulsion copolymer of (A) from about 65 to 90% by weight of methylmethacrylate and (B) from 2 to 20% by weight of β-hydroxyethylmethacrylate, and
(2) a plasticizing quantity of hexakis(methoxymethyl) melamine.

References Cited by the Examiner

UNITED STATES PATENTS

| 2,906,724 | 9/1959 | Daniel | 260—856 |
| 2,994,676 | 8/1961 | Kucsan et al. | 260—29.6 |
| 3,107,227 | 10/1963 | Suen et al. | 260—853 |

OTHER REFERENCES

Principles of Polymer Chemistry, Flory, Cornell University Press, Ithaca, New York, 1953, pages 203–4.

MURRAY TILLMAN, *Primary Examiner.*

P. LIEBERMAN, *Assistant Examiner.*